(12) United States Patent
Pervan

(10) Patent No.: US 10,364,578 B2
(45) Date of Patent: *Jul. 30, 2019

(54) PANEL COATING

(71) Applicant: CERALOC INNOVATION AB, Viken (SE)

(72) Inventor: Darko Pervan, Viken (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,874

(22) Filed: Jun. 18, 2018

(65) Prior Publication Data

US 2018/0291638 A1 Oct. 11, 2018

Related U.S. Application Data

(63) Continuation of application No. 14/237,617, filed as application No. PCT/SE2012/050896 on Aug. 23, 2012, now Pat. No. 10,017,950.

(30) Foreign Application Priority Data

Aug. 26, 2011 (SE) ...................................... 1150774
Jan. 9, 2012 (SE) ...................................... 1250007

(51) Int. Cl.
*B27M 3/04* (2006.01)
*B32B 21/02* (2006.01)
(Continued)

(52) U.S. Cl.
CPC ............. *E04F 15/107* (2013.01); *B27M 3/04* (2013.01); *B32B 21/02* (2013.01); *B32B 21/06* (2013.01);
(Continued)

(58) Field of Classification Search
CPC .......... B27M 3/04; B32B 21/02; B32B 21/06; B32B 2255/08; B32B 2255/12;
(Continued)

(56) References Cited

U.S. PATENT DOCUMENTS 5,405,681 A 4/1995 Nakayama et al.
6,001,490 A 12/1999 Rienäcker
(Continued)

FOREIGN PATENT DOCUMENTS

DE 197 15 268 A1 10/1998
DE 101 56 956 A1 6/2003
(Continued)

OTHER PUBLICATIONS

International Search Report for WO2013/032387.*
(Continued)

*Primary Examiner* — Sonya M Sengupta
(74) *Attorney, Agent, or Firm* — Buchanan Ingersoll & Rooney P.C.

(57) ABSTRACT

A method for coating of a floor panel and a floor panel produced by the method. A method for producing a laminated product, for example a building panel, preferably a floor panel. The method includes applying a paper on one side of a wood fiber based core, e.g., an HDF panel, creating a décor on the paper by a digital printing process, applying a resin, preferably a melamine formaldehyde resin, on the paper, heating the décor and the paper with the resin, preferably by using an IR lamp; and applying heat and pressure in order to cure the resin and thereby obtain a laminated product. Also, alternative methods for producing a laminated product, and such a laminated product.

19 Claims, 5 Drawing Sheets

(51) Int. Cl.
*B32B 21/06* (2006.01)
*B32B 37/06* (2006.01)
*B32B 37/10* (2006.01)
*B32B 38/00* (2006.01)
*B32B 38/06* (2006.01)
*B32B 38/08* (2006.01)
*E04F 15/10* (2006.01)

(52) U.S. Cl.
CPC .............. *B32B 38/08* (2013.01); *B32B 37/06* (2013.01); *B32B 37/10* (2013.01); *B32B 38/06* (2013.01); *B32B 38/145* (2013.01); *B32B 2255/08* (2013.01); *B32B 2255/12* (2013.01); *B32B 2255/26* (2013.01); *B32B 2260/028* (2013.01); *B32B 2260/046* (2013.01); *B32B 2307/718* (2013.01); *B32B 2309/02* (2013.01); *B32B 2309/04* (2013.01); *B32B 2309/12* (2013.01); *B32B 2310/0825* (2013.01); *B32B 2317/12* (2013.01); *B32B 2419/04* (2013.01); *B32B 2451/00* (2013.01); *B32B 2471/00* (2013.01); *Y10T 428/249925* (2015.04)

(58) Field of Classification Search
CPC .......... B32B 2255/26; B32B 2260/028; B32B 2260/046; B32B 2307/718; B32B 2309/02; B32B 2309/04; B32B 2309/12; B32B 2310/0825; B32B 2317/12; B32B 2419/04; B32B 2451/00; B32B 2471/00; B32B 37/06; B32B 37/10; B32B 38/06; B32B 38/08; B32B 38/145; E04F 15/107; E02F 9/2883; Y10T 428/249925; Y02P 10/212
USPC ........................ 156/277, 279, 297; 428/292.4
See application file for complete search history.

(56) References Cited

U.S. PATENT DOCUMENTS

| | | | |
|---|---|---|---|
| 6,666,951 B1* | 12/2003 | Kostiw | B27N 1/00 156/62.4 |
| 7,811,489 B2 | 10/2010 | Pervan | |
| 8,349,234 B2 | 1/2013 | Ziegler et al. | |
| 8,349,235 B2 | 1/2013 | Pervan et al. | |
| 8,419,877 B2 | 4/2013 | Pervan et al. | |
| 8,431,054 B2 | 4/2013 | Pervan et al. | |
| 8,480,841 B2 | 7/2013 | Pervan et al. | |
| 8,481,111 B2 | 7/2013 | Ziegler et al. | |
| 8,617,439 B2 | 12/2013 | Pervan et al. | |
| 8,663,785 B2 | 3/2014 | Ziegler et al. | |
| 8,728,564 B2 | 5/2014 | Ziegler et al. | |
| 8,784,587 B2 | 7/2014 | Lindgren et al. | |
| 8,920,874 B2 | 12/2014 | Ziegler et al. | |
| 8,920,876 B2 | 12/2014 | Vetter et al. | |
| 8,993,049 B2 | 3/2015 | Pervan | |
| 9,085,905 B2 | 7/2015 | Persson et al. | |
| 9,181,698 B2 | 11/2015 | Pervan et al. | |
| 9,255,405 B2 | 2/2016 | Pervan et al. | |
| 9,296,191 B2 | 3/2016 | Pervan et al. | |
| 9,352,499 B2 | 5/2016 | Ziegler et al. | |
| 9,403,286 B2 | 8/2016 | Vetter et al. | |
| 9,410,319 B2 | 8/2016 | Ziegler et al. | |
| 9,556,622 B2 | 1/2017 | Pervan et al. | |
| 9,573,343 B2 | 2/2017 | Pervan | |
| 9,783,996 B2 | 10/2017 | Pervan et al. | |
| 10,017,950 B2 | 7/2018 | Pervan | |
| 10,214,913 B2 | 2/2019 | Persson et al. | |
| 2004/0123542 A1* | 7/2004 | Grafenauer | B44C 5/043 52/506.01 |
| 2004/0191547 A1* | 9/2004 | Oldorff | E04F 15/02 428/479.3 |
| 2004/0250911 A1 | 12/2004 | Vogel | |
| 2005/0193677 A1 | 9/2005 | Vogel | |
| 2005/0249929 A1 | 11/2005 | Reichwein et al. | |
| 2006/0182938 A1 | 8/2006 | Oldorff | |
| 2007/0224438 A1 | 9/2007 | Van Benthem et al. | |
| 2009/0145066 A1 | 6/2009 | Pervan | |
| 2009/0155612 A1* | 6/2009 | Pervan | B32B 21/02 428/498 |
| 2009/0294037 A1 | 12/2009 | Oldorff | |
| 2010/0092731 A1 | 4/2010 | Pervan et al. | |
| 2010/0196678 A1 | 8/2010 | Vermeulen | |
| 2010/0239820 A1 | 9/2010 | Buhlmann | |
| 2010/0291397 A1 | 11/2010 | Pervan et al. | |
| 2010/0300030 A1 | 12/2010 | Pervan et al. | |
| 2010/0307675 A1 | 12/2010 | Buhlmann | |
| 2010/0307677 A1 | 12/2010 | Buhlmann | |
| 2010/0323187 A1 | 12/2010 | Kalwa | |
| 2011/0175251 A1 | 7/2011 | Ziegler et al. | |
| 2011/0177319 A1 | 7/2011 | Ziegler et al. | |
| 2011/0177354 A1 | 7/2011 | Ziegler et al. | |
| 2011/0189448 A1 | 8/2011 | Lindgren et al. | |
| 2011/0247748 A1 | 10/2011 | Pervan et al. | |
| 2011/0250404 A1 | 10/2011 | Pervan et al. | |
| 2011/0283650 A1 | 11/2011 | Pervan et al. | |
| 2011/0293906 A1 | 12/2011 | Jacobsson | |
| 2012/0263878 A1 | 10/2012 | Ziegler et al. | |
| 2012/0263965 A1 | 10/2012 | Persson et al. | |
| 2012/0264853 A1 | 10/2012 | Ziegler et al. | |
| 2012/0288689 A1 | 11/2012 | Hansson et al. | |
| 2012/0308774 A1 | 12/2012 | Håkansson et al. | |
| 2013/0092314 A1 | 4/2013 | Zeigler et al. | |
| 2013/0095315 A1 | 4/2013 | Pervan et al. | |
| 2013/0111845 A1 | 5/2013 | Pervan et al. | |
| 2013/0189534 A1 | 7/2013 | Pervan et al. | |
| 2013/0269863 A1 | 10/2013 | Pervan et al. | |
| 2013/0273244 A1 | 10/2013 | Vetter et al. | |
| 2013/0273245 A1 | 10/2013 | Ziegler et al. | |
| 2014/0017452 A1 | 1/2014 | Pervan | |
| 2014/0044872 A1 | 2/2014 | Pervan | |
| 2014/0075874 A1 | 3/2014 | Pervan et al. | |
| 2014/0171554 A1 | 6/2014 | Ziegler et al. | |
| 2014/0178630 A1 | 6/2014 | Pervan et al. | |
| 2014/0186610 A1 | 7/2014 | Pervan | |
| 2014/0199558 A1 | 7/2014 | Pervan et al. | |
| 2014/0234531 A1 | 8/2014 | Ziegler et al. | |
| 2015/0017461 A1 | 1/2015 | Lindgren et al. | |
| 2015/0079280 A1 | 3/2015 | Vetter et al. | |
| 2015/0093502 A1 | 4/2015 | Ziegler et al. | |
| 2015/0111055 A1 | 4/2015 | Persson et al. | |
| 2015/0159382 A1 | 6/2015 | Pervan | |
| 2015/0197942 A1 | 7/2015 | Pervan et al. | |
| 2015/0197943 A1 | 7/2015 | Ziegler et al. | |
| 2015/0275526 A1 | 10/2015 | Persson et al. | |
| 2015/0298433 A1 | 10/2015 | Kalwa | |
| 2016/0031189 A1 | 2/2016 | Pervan et al. | |
| 2016/0114495 A1 | 4/2016 | Pervan et al. | |
| 2016/0186318 A1 | 6/2016 | Pervan et al. | |
| 2016/0230400 A9 | 8/2016 | Pervan et al. | |
| 2016/0368180 A1 | 12/2016 | Ziegler et al. | |
| 2016/0369507 A1 | 12/2016 | Pervan | |
| 2016/0375674 A1 | 12/2016 | Schulte | |
| 2017/0120564 A1 | 5/2017 | Schulte | |
| 2017/0165936 A1 | 6/2017 | Schulte | |
| 2017/0190156 A1 | 7/2017 | Ziegler et al. | |
| 2017/0305119 A1 | 10/2017 | Bergelin et al. | |
| 2017/0348984 A1 | 12/2017 | Pervan et al. | |
| 2018/0002934 A1 | 1/2018 | Pervan et al. | |
| 2018/0370278 A1 | 12/2018 | Persson et al. | |
| 2019/0010711 A1 | 1/2019 | Pervan et al. | |

FOREIGN PATENT DOCUMENTS

| | | |
|---|---|---|
| DE | 10 2010 045 266 A | 3/2012 |
| EP | 1 242 702 | 9/2002 |
| EP | 1 454 763 A2 | 9/2004 |
| EP | 1 242 702 B1 | 11/2004 |
| EP | 1 584 378 A1 | 10/2005 |
| EP | 1 749 676 A1 | 2/2007 |
| EP | 1 977 909 A2 | 10/2008 |
| EP | 1 454 763 B1 | 8/2009 |

(56) References Cited

FOREIGN PATENT DOCUMENTS

| | | |
|---|---|---|
| EP | 2 105 320 A1 | 9/2009 |
| EP | 1 977 909 A3 | 1/2010 |
| EP | 2 213 476 A1 | 8/2010 |
| EP | 2213476 A1 * | 8/2010 ............ B44C 5/0446 |
| EP | 1 977 909 B1 | 11/2010 |
| EP | 2 264 259 A2 | 12/2010 |
| JP | H05-162230 A | 6/1993 |
| NZ | 225556 A1 | 2/1992 |
| TZ | WO 2007/015669 A2 | 2/2007 |
| WO | WO 01/48333 A1 | 7/2001 |
| WO | WO 2007/015669 A3 | 2/2007 |
| WO | WO 2008/004690 A8 | 1/2008 |
| WO | WO 2008/004960 A2 | 1/2008 |
| WO | WO 2008/004960 A3 | 1/2008 |
| WO | WO 2008/148771 A1 | 12/2008 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO-2009124704 A1 * | 10/2009 .............. B27N 3/06 |
| WO | WO 2010/087752 A1 | 8/2010 |
| WO | WO 2011/087422 A1 | 7/2011 |
| WO | WO 2011/087423 A1 | 7/2011 |
| WO | WO 2013/032387 A1 | 3/2013 |
| WO | WO 2014/027179 A1 | 2/2014 |

OTHER PUBLICATIONS

Written Opinion for WO2013/032387.*
U.S. Appl. No. 16/062,277, Persson et al.
International Search Report /Written Opinion issued in PCT/SE2012/050896, dated Nov. 12, 2012, 19 pages, ISA/SE, Patent-och registreringsverket, Stockholm, SE.
Extended European Search Report issued in EP 12828781.0, dated Mar. 4, 2015, European Patent Office, Munich, DE, 4 pages.
Extended European Search Report issued in EP 17190502.9, dated Jan. 18, 2018, European Patent Office, Munich, DE, 6 pages.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE, XP055332791.
Odian, George, "Principles of Polymerization," 1991, $3^{rd}$ Edition, 5 pages incl. pp. 122-123, John Wiley & Sons, Inc., New York, NY, USA.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
Persson, Hans, et al., U.S. Appl. No. 16/062,277 entitled "A Method to Produce a Building Panel and a Semi-Finished Product," filed in the U.S. Patent and Trademark Office Jun. 14, 2018.

* cited by examiner

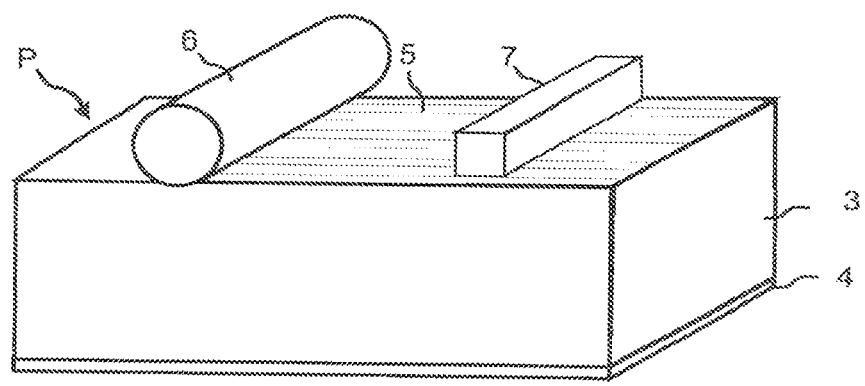
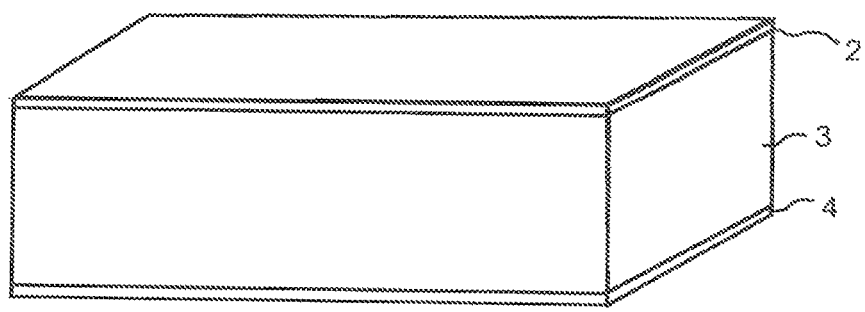
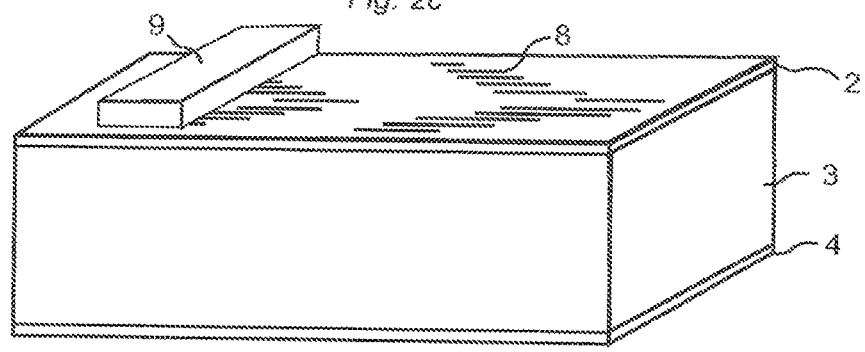
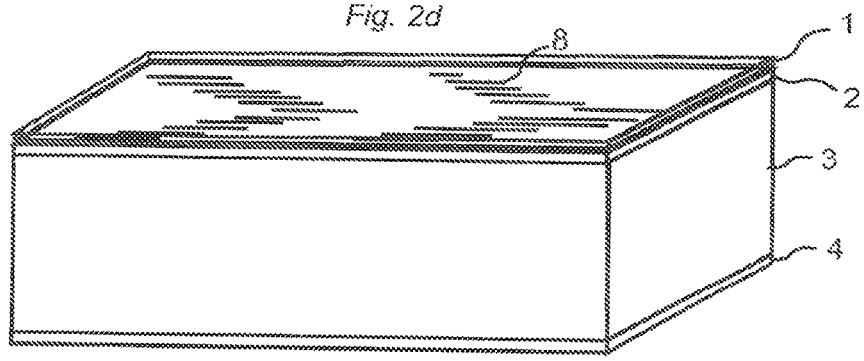

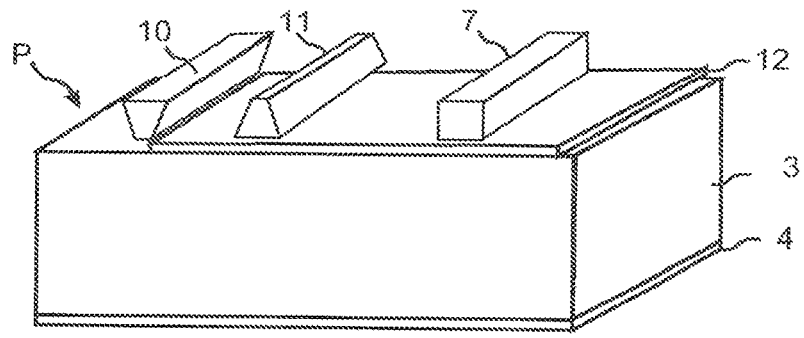
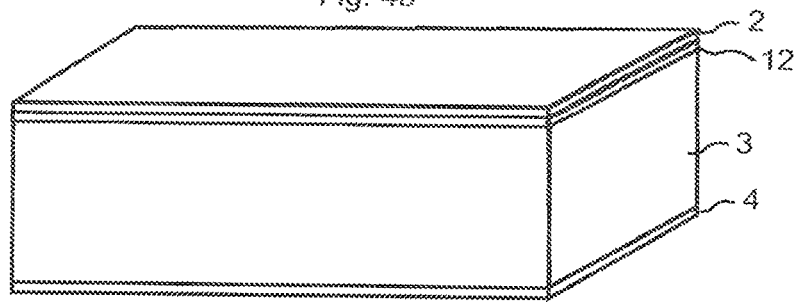
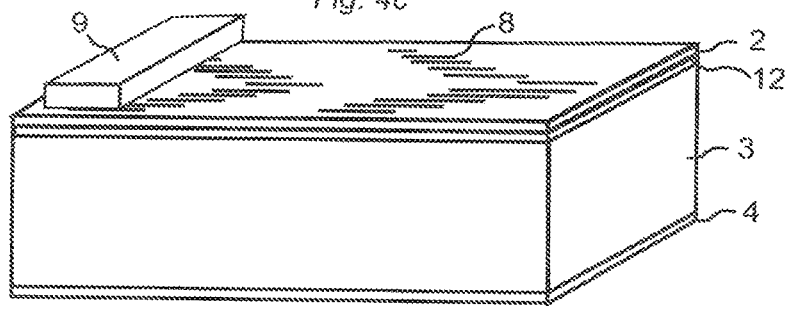
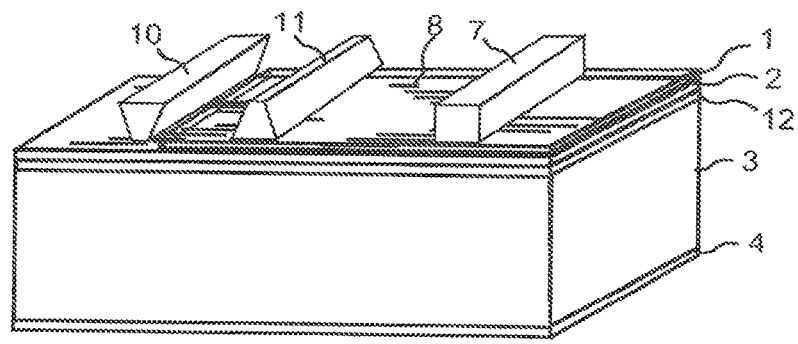

PANEL COATING

CROSS REFERENCE TO RELATED APPLICATIONS

The present application is a continuation of U.S. application Ser. No. 14/237,617, filed on Feb. 7, 2014, which is U.S. national stage of International Application No. PCT/SE2012/050896, filed on Aug. 23, 2012, which claims the benefit of Swedish Application No. 1250007-0, filed on Jan. 9, 2012, and the benefit of Swedish Application No. 1150774-6, filed on Aug. 26, 2011. The entire contents of each of U.S. application Ser. No. 14/237,617, International Application No. PCT/SE2012/050896, Swedish Application No. 1250007-0, and Swedish Application No. 1150774-6 are hereby incorporated herein by reference in their entirety.

TECHNICAL FIELD

The disclosure generally relates to the field of coating of panels, e.g., building panels. More particular, the disclosure relates to a method for coating of a floor panel and a floor panel produced by the method.

FIELD OF APPLICATION

The present disclosure is particularly suitable for use in floating floors, which are formed of floor panels with a wood fiber core and a thin decorative wear resistant surface. The following description of prior-art technique, problems of known systems and objects and features of the disclosure will therefore, as a non-restrictive example, be aimed above all at this field of application and in particular at floorings which are similar to traditional wood fiber based laminate floorings.

It should be emphasized that the disclosure can also be used in other applications as for example wall panels, ceilings, and furniture components and similar.

KNOWN TECHNOLOGY

Traditional laminated panels P intended to be used for e.g., flooring, wall panels or furniture components are produced by the following steps as shown in FIG. 1a:
applying a melamine formaldehyde resin impregnated kraft paper as a balancing layer 4 on one side of a core 3 of wood fiber based material;
applying a by melamine formaldehyde resin impregnated printed décor paper 2 on the other side of the core 3;
applying a melamine formaldehyde resin impregnated transparent overlay paper 1 with wear resistant particles, for example aluminum oxide, on the décor paper; and
curing the resins by applying heat and pressure in a continuous or discontinuous press to obtain a laminated product.

Typical press parameters are 40 bar pressure and a temperature of 160-200° C. with a pressing time of 12-30 seconds. Pressing of the top surface is generally made against an embossed press plate that created the surface structure of the panel. The décor paper that prior to impregnation has a weight of 60-80 g/m² comprises generally about 50 wt % of melamine formaldehyde thermosetting resins. The resin content in the overlay may be even higher.

It is also known that an unimpregnated décor paper may be used to reduce the impregnation cost and to increases the stock lifetime of the printed decor paper since an impregnated paper has a maximum shelf lifetime of 6-12 months. Other disadvantages related to impregnated decorative papers are that the paper must be stored in a climate controlled warehouse in order to avoid sticking, that a minimum quantity of about 3 tons have to be impregnated in order to obtain low production costs and that the decorative paper swells and shrinks during impregnation and this creates problems when the printed patter must be adapted to a panel size or the embossing pattern of the press plates.

As an alternative to the overlay paper, it is known to apply the melamine formaldehyde resin and the wear resistant particles on top of the decor paper in liquid form that subsequently is dried prior to pressing or in dry powder form mixed with for example wood fibers. Such a protective layer is referred to as "liquid overlay" or "powder overlay".

Furthermore it is known to apply an unimpregnated décor paper directly to the board and then add resin in wet liquid form in several steps on the board and on the décor paper, with intermediate drying zones to remove the water from the resin. The impregnation is made in line with the pressing operation It is also known, as shown in FIG. 1b that an impregnated core paper may be applied as sublayer 12 under a decorative unimpregnated paper and that resins from the core paper may penetrate into the decorative paper during pressing. This production method is complicated and not cost efficient.

Traditional laminate floorings use a decorative paper that is printed prior to impregnation. Even when unimpregnated papers may be used, such papers are printed in separate printing operations and are thereafter applied on a core prior to pressing. Such printing gives the disadvantage that the decorative paper has to be positioned precisely on the core in order to match the embossed surface of the press plate or the size of the machined floor panel.

FIGS. 1c and 1d show that digital printing technology based on a non-contact process where a digital printing device 9 comprising a print head, usually a so called Piezo head, fires small drops of ink comprising a color substance on a substrate 2, may be used to create a décor. The major advantage is the production flexibility, which allows that small production volumes can be economically manufactured.

The digital print 8 is generally applied on a paper 2, which is already coated with a base layer comprising a base color or directly on the panel core, which generally also comprises a base layer. The digital print is covered by a transparent protective layer that may be a conventional overlay or a UV cured transparent lacquer.

Digital printing may also be used to print on the overlay paper sheet. The decorative paper provides the base coat and the print on the lower side of the impregnated overlay provides an additional pattern that is required to create a wood or stone design.

The decorative paper 2 or the overlay may be printed digitally prior impregnation 20 as shown in FIG. 1c or after impregnation 20 as shown in FIG. 1d. The end result is always that a digitally printed décor 8 is applied on a paper based print carrier 2 that is impregnated and thereafter applied as a separate printed and impregnated sheet on the core 3.

DEFINITION OF SOME TERMS

In the following text, the visible surface of the installed floor panel is called "front side", while the opposite side of the floor panel, facing the sub floor, is called "rear side". By "up" is meant towards the front side and by "down" towards the rear side. The sheet-shaped material that comprises the major part of a floor panel is called "core". By "surface layer" is meant all layers applied to the core closest to the front side and covering preferably the entire front side of the floorboard. By "decorative surface layer" is meant a layer, which is mainly intended to give the floor its decorative appearance. "Wear layer" or "protective layer" relates to a layer, which is mainly adapted to improve the durability of the front side. By "raw paper" is meant unimpregnated paper that does not comprise any thermosetting binders or a paper that only comprises small amounts of thermosetting binders for example less than about 20 wt % and where a considerable part of the resin content in the pressed paper is injected during pressing from a layer above and/or below the paper.

SUMMARY AND OBJECTS

An overall objective of the present disclosure is to provide an improved method for coating of panels. A specific objective is to avoid impregnation of the decorative paper and to eliminate the need for a precise positioning of the decorative paper on the core prior to pressing.

The present disclosure combines process flexibility and product features as listed a-d below.

The drawback of all known technologies using printed paper is that there is no method that combines maximum process flexibility and product features in terms of a) the use of unimpregnated or raw papers b) adding flexibility to the process by being able to choose the decor in the press line by printing the decor digitally with an inkjet printer, c) giving the surface of the pressed board a structure by using an embossed press plate that forms the board during pressing when the thermosetting resins are cured and d) giving the product impact and wear resistance as good as or better as traditional direct laminated panels.

By printing the décor after the paper is positioned on the core increases the accuracy of décor position and makes it possible to obtain an improved surface design. Avoiding impregnation of the paper gives cost advantages and increased production flexibility.

A first aspect of the disclosure is a method for producing a laminated product, for example a building panel, preferably a floor panel, wherein the method comprising the steps of:
  applying a paper on one side of a wood fiber based core, e.g., an HDF panel,
  creating a décor on the paper by a digital printing process,
  applying a resin, preferably a melamine formaldehyde resin, on the paper;
  heating the décor and the paper with the resin, preferably by using an IR lamp; and
  applying heat and pressure in order to cure the resin and thereby obtain a laminated product.

Preferably, the step of creating the décor by the digital printing process is performed after the paper is applied to the core.

The method may further comprise the step of applying a powder based sub layer on the core and under the paper. Said powder based sub layer comprising wood fibers and a thermosetting powder resin, preferably a melamine formaldehyde resin.

The powder sub based layer preferably comprises about 50 wt % wood fibers and about 50 wt % melamine resin (e.g., Kuaramin 773).

Alternatively the powder sub layer may preferably comprise about 60-80 wt % wood fibers and 20-40 wt % melamine/urea resins.

The method may further comprise the step of applying moisture on the powder based sub layer and thereafter applying heat in order to dry the powder based sub layer.

The method may further comprise the steps of:
  applying a liquid resin, preferably a melamine formaldehyde resin, on the core; and
  drying the liquid resin, preferably by using an IR lamp, before the paper is applied on the core.

The resin applied on the paper may be in powder or liquid form. The resin in powder form may be included in a mix comprising wood fibers and said resin for forming a powder based overlay.

The method may further comprise the step of creating a décor on the powder resin applied on the paper by a digital printing process. This step may replace the printing on the paper.

The surface weight of the powder on the paper is preferably about 200 g/m.

The method may further comprise the step of applying moisture on the resin in powder form.

The method may further comprise the step of applying wear resistant particles, preferably aluminum oxide particles, on the paper before heating the décor.

The method may further comprise the step of applying additive particles, such as submicron particles based on silica or aluminum oxides, to improve the scuff resistance, on the paper before heating the décor.

The method may further comprise the step of applying cellulose fibers, preferably alpha cellulose fibers, on the paper, before heating the décor.

The method may further comprise the step of applying a layer on the other side of the core, before applying heat and pressure, to obtain a balancing layer.

The balancing layer may be a powder layer comprising wood fibers and a resin or a paper.

The surface weight of paper for the décor is preferably about 60, 70, 80 or 85 $g/m^2$. Even thinner papers may be used with a surface weight of about 40 to 60 $g/m^2$, preferably 40 to 50 $g/m^2$.

The solid content of the resin is preferably in the range of about 50±10 wt %., more preferably 50±2 wt %.

The digital print may be a non-contact process comprising a Piezo print head that applies water-based drops. The color pigments may be applied in a separate step in dry form. The color pigments may be bonded by the water drops.

The press parameters may be in the range of about 20-60 bar, preferably about 40 bar and the temperature in the range of about 160-200° C., preferably about 180° C., with a pressing time of about 12-30 seconds.

As disclosed in WO2009/124704 it is also possible to add a layer of a powder mixture comprising wood powder, dry resin and potentially other additives under the décor paper to increase impact resistant, allow deeper embossing and to impregnate an unimpregnated décor paper from below during the curing process in the press.

A second aspect of the disclosure is a floor panel produced according to the first or the third aspect.

A third aspect of the disclosure is a method for producing a laminated product, for example a building panel, preferably a floor panel, wherein the method comprising the steps of:
  applying a powder based sub layer comprising wood fibers and a thermosetting resin on a wood fiber based core, e.g., an HDF panel, applying a raw paper on the powder based sub layer,
applying a protective powder based or paper based overlay comprising a melamine formaldehyde resin and aluminum oxide on the raw paper;
applying heat and pressure in order to impregnate the raw paper, to cure the resin and thereby obtain a laminated product.

The method may further comprise the step applying a powder based balancing layer comprising wood fibers and a thermosetting resin on a rear side of the core.

In one embodiment, the overlay may be a powder based overlay, and a paper overlay may be applied on the powder based overlay.

A fourth aspect of the disclosure is a floor panel comprising a core, a balancing layer on a rear side of said core, and a surface layer on a front side of said core. The surface layer comprises a decorative paper, a protective transparent paper, a first powder based sub layer arranged under the decorative paper, and a second powder based sub layer arranged between the decorative paper and the protective transparent paper. The first and the second sublayers comprise fibers having an average length, which is smaller than the average length of the fibers in the decorative and overlay papers.

The balancing layer may be a powder based balancing layer comprising wood fibers. The wood fibers may in all embodiments be in powder form.

BRIEF DESCRIPTION OF THE DRAWINGS

FIGS. 2a-2d illustrate a first embodiment of the invention.
FIGS. 4a-4d illustrate a third embodiment of the invention.

DESCRIPTION OF EMBODIMENTS OF THE INVENTION

Figure 1A:
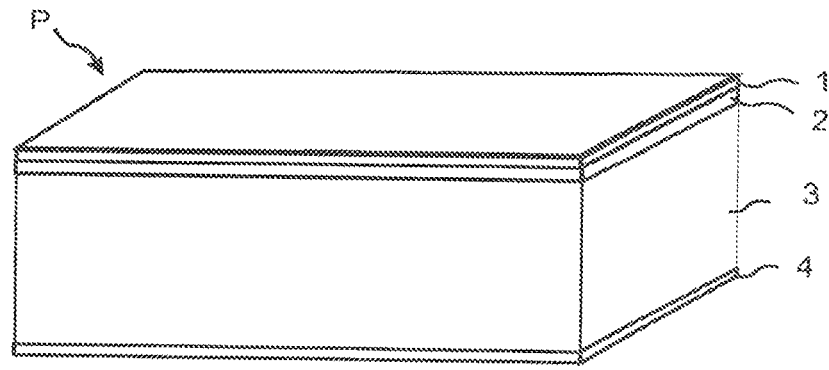
FIGS. 1a-1d illustrate known laminated floor panels.
Figure 1B:
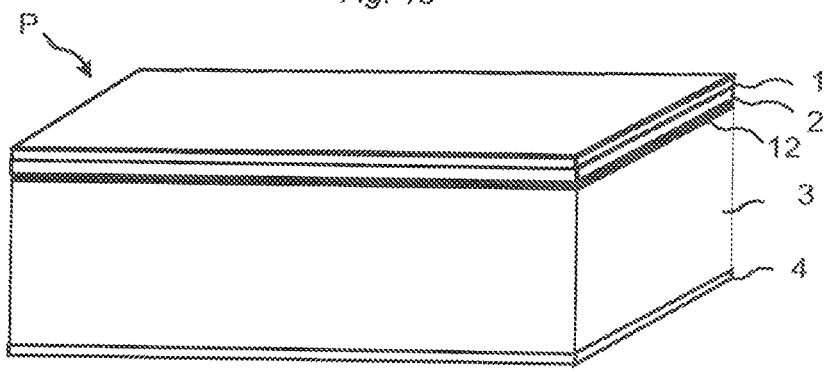
Figure 1C:
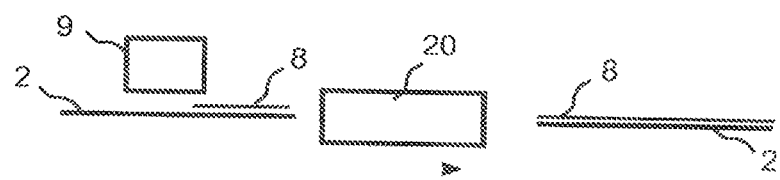
Figure 1D:
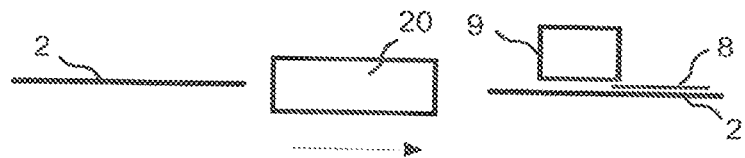

The disclosure will in the following be described in connection to exemplary embodiments.

FIGS. 2a -2d show a first embodiment of the invention.

FIG. 2a shows a panel P comprising a core 3, preferably a HDF core and a balancing layer 4 on the rear side of the core 3. The balancing layer 4 may be a conventional kraft paper impregnated with a thermosetting resin, preferably a melamine formaldehyde resin, or a powder backing comprising wood fibers and a thermosetting resin, preferably a melamine formaldehyde resin. The application of a powder backing is made by a scattering unit 10 in the same way as shown in FIG. 4a. The spraying 11 and the drying device 7 will stabilize the powder and create a balancing layer 4 that may be connected to the core 3 such that the panel P may be turned with the rear side pointing downwards prior to the application of the surface layers 1, 2, 12. A resin 5, preferably a liquid thermosetting resin that preferably is a melamine formaldehyde resin, is applied on the upper side of the core 3, preferably with a roller 6 or by spraying. The resin is heated and dried by using a drying device 7 such as for example an IR lamp, hot air, microwaves and similar.

FIG. 2b shows a paper layer 2 that is applied on the dried resin. The paper is preferably a raw paper. The paper may comprise a basic color or may be partly printed. It is not necessary to align the paper precisely since there is no final printed pattern on the paper 2.

FIG. 2c shows a digital print 8 that is printed on the paper 2 by a digital printing device 9. Digital printing is a non-contact process where a digital print head, preferably a Piezo head, fires drops of a liquid substance on a substrate and creates a pattern. The liquid substance may comprise color pigments and may be water based. Alternatively the pigments may be applied separately in dry powder form and the digital print head may essentially only apply a liquid substance that may be transparent and that may comprise a substance that acts as a binder and connects the pigments to the substrate. Non-bonded pigments may be removed by for example an air stream or gravity. Such a two-step digital binder and powder (BAP) printing is very cost efficient especially when large amounts of pigments are used to create a pattern. BAP allows that substantial amounts of pigmented powder may be applied for example more than 20 $g/m^2$ preferably about 20-50 $g/m^2$.

FIG. 2d shows that the paper 2 is coated with a liquid thermosetting resin, preferably a melamine formaldehyde resin, in order to create a protective layer 1 similar to a conventional overlay. The coating is preferably made in the same way as shown and described in FIG. 2a. The liquid resin comprises preferably aluminum oxide particles and/or cellulose fibers preferably alpha cellulose fibers.

A coating of the paper with a base color may also be made prior to the digital printing.

The first embodiment of the method comprises the step of:
coating of a wood fiber based core 3, preferably an HDF panel, with a liquid melamine formaldehyde resin;
drying the liquid resin;
attaching a paper 2 to the core 3;
providing a décor 8 on the paper 2 by a digital printing process;
coating the paper 2 with the decor with a liquid melamine resin, preferably comprising aluminum oxide particles and/or cellulose fibers preferably alpha cellulose fibers;
drying the coating; and
applying heat and pressure to cure the resins and thereby obtain a laminated product.

An advantage is that it is possible to use an unprinted paper, which reduces the warehouse costs and improves the process flexibility. By printing the paper after the paper is attached to the core the accuracy of the décor position is improved.

The coating of the paper may be replaced or combined with a conventional overlay that is applied over the digitally printed paper.

Figure 3A:
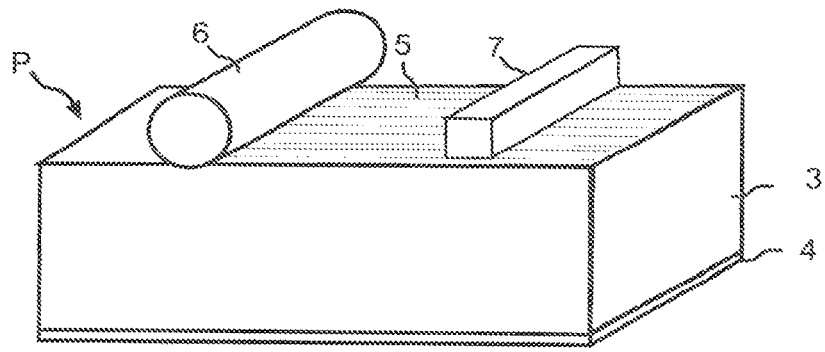
FIGS. 3a-d illustrate a second embodiment of the invention.
Figure 3B:
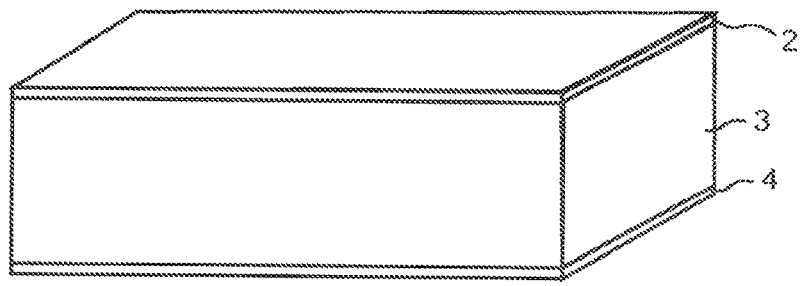
Figure 3C:
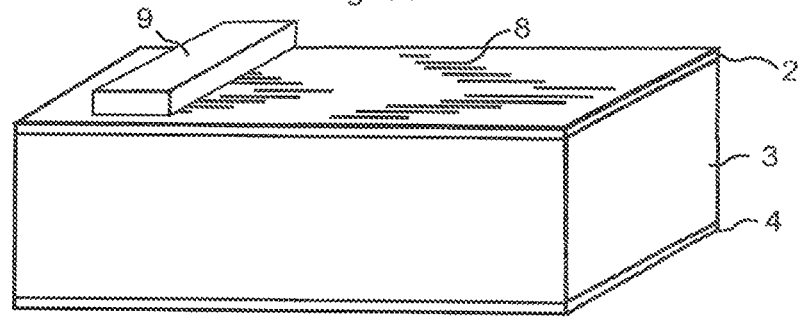
Figure 3D:
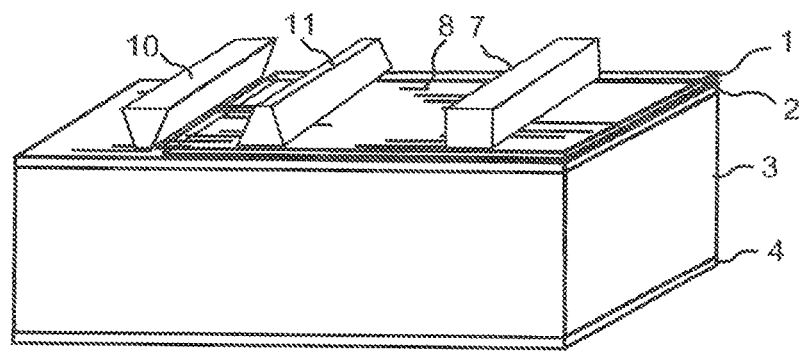

FIGS. 3a-3d show a second embodiment of the invention. The forming of the balancing layer 4, the coating of the core 3 and the digital printing of the paper as shown in FIGS. 3a-3c are the same as in the first embodiment. However, the protective layer 1 has been replaced with a powder overlay that is scattered by a scattering unit 10 in dry form over the paper 2 with the digital print 8 as shown in FIG. 3d. Said powder overlay preferably comprising fibers, preferably processed wood fibers, a resin, preferably a melamine formaldehyde resin, and wear resistant particles, preferably aluminum oxide. A liquid substance preferably comprising water may be sprayed on the powder overlay by a spraying device 11 and dried by a drying device 7 in order to stabilize the powder prior to the pressing operation.

The second embodiment of the first aspect of the method comprises the step of:
coating of a wood fiber based core 3, preferably an HDF panel, with a liquid melamine formaldehyde resin;
drying the liquid resin;
attaching a paper 2 to the core 3;

providing a décor 8 on the paper 2 by a digital printing process;

applying a powder overlay 1 on the printed décor paper 2, said overlay 1 preferably comprising fibers, a resin, preferably a melamine formaldehyde resin, and wear resistant particles, preferably aluminum oxide, applying moisture on the powder overlay 1;

drying the powder overlay 1; and applying heat and pressure to cure the resins and thereby obtain a laminated product.

A further advantage with the second embodiment is that the impact resistance is improved due to the substantial amounts of fibers in the resin matrix, obtained from the powder overlay.

FIGS. 4a-4d show a third embodiment of the invention. FIG. 4a shows that a powder sublayer 12 comprising a wood fibers and a thermosetting resin, preferably a melamine formaldehyde resin or a melamine/urea resin is applied on the upper side of the core 3. The balancing layer 4 may be a paper or a powder backing as described above. The sublayer 12 may be applied in the same way as the powder overlay with a scattering unit 10. Preferably a spraying device 11 that applies moisture on the powder and a drying device 7 may also be used to stabilize the powder in order to facilitate the application of the paper 2 over the powder sub layer 12. FIGS. 4c and 4d show that the paper 2 is provided with a digital print 8 by a digital printing device 9 and preferably with a powder overlay 1 or a conventional paper overlay 1 as described above. The powder overlay 1 may be applied by a scattering unit 10, sprayed with water by a spraying device 11 and dried by a drying device 7.

The third embodiment of the method comprises the step of:

applying a powder based sublayer 12 on a core 3, preferably an HDF panel, and preferably applying moisture on the sublayer and thereafter drying the sublayer;

attaching a paper 2 on the sublayer 12;

providing a décor 8 on the paper 2 by a digital printing process;

applying a powder overlay 1 on the printed décor paper 2, said overlay preferably comprising fibers, a resin, preferably a melamine formaldehyde resin, and wear resistant particles, preferably aluminum oxide, applying moisture on the powder overlay 1;

drying the powder overlay 1; and applying heat and pressure to cure the resins and thereby obtain a laminated product.

A further advantage with the third embodiment is that the demand for drying is decreased since no wet resins are applied. The sub layer 12 gives an increased impact resistance and possibility to form a surface with deep embossing. The sub layer 12 is a cost efficient way to provide a sufficient amount of binders that may penetrate into the paper 2 during pressing The surface weight of the powder overlay is preferably about 200 g/m$^2$ but may be as low as 50 g/m$^2$ or exceed 400 g/m$^2$. The weight of the sub layer is preferably 100-500 g/m$^2$.

The invention makes it possible to reduce the weight of the décor paper since no impregnation is needed and there is no need for a high "wet strength". The weight of the raw paper may be lower than 60 g/m$^2$ preferably about 40 to 50 g/m$^2$. The press parameters in the three embodiments above are preferably about 40 bar and the temperature in the range of about 160-200° C., preferably about 180° C., with a pressing time of about 10-30 seconds depending on the layer thickness.

Figure 5A:
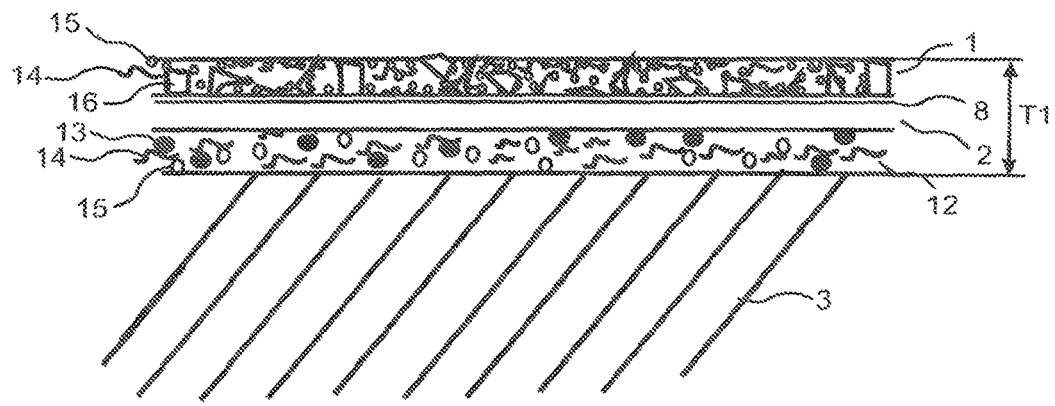
FIGS. 5a-5c illustrate forming of the surface layer.
Figure 5B:
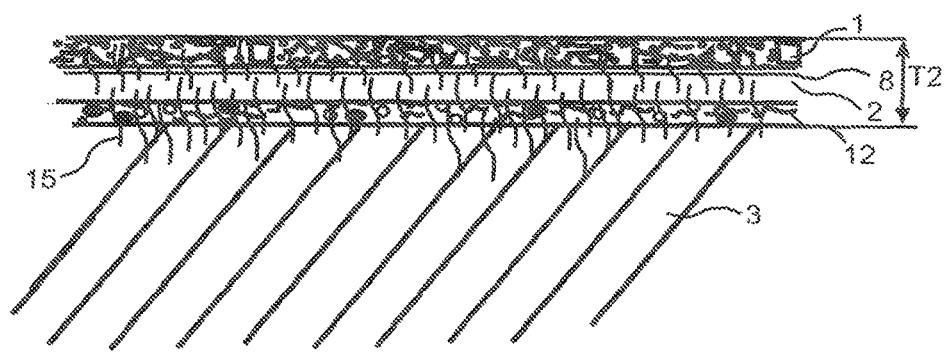

FIG. 5a shows the surface layer prior to pressing according to the third aspect of the invention. The sub layer 12 comprises in this embodiment wood fibers 14, dry thermosetting resin particles 15 and preferably also color pigments 13 that give the sub layer a basic color and prevents that the core surface is visible through the thin paper. This reduces the requirement on the digital print 8 and the print may be made with lower ink content, preferably with an ink content of less than 10 g/m$^2$. The powder overlay 1, which is applied over the paper 2 with the digital print 8, comprises aluminum oxide particles 16, wood fibers 14 and resin particles 15. FIG. 5b shows the surface layer after pressing. The powder has been compressed and the pressed surface layer has in this embodiment preferably a thickness T2 that is less than about 80% and even more preferably less than about 50% of the surface thickness T1 prior to the pressing. The compression of the powder under heat and pressure, when the powder resin 15 becomes fluid, impregnates the paper 2 from above and from below and connects the surface layers to the core 3.

The basic principles of the invention to use a powder sub layer 12 to impregnate a raw paper 2 during pressing may also be used even without the digital printing to produce a surface with a conventional raw decorative printed paper and preferably also with conventional overlay and/or a conventional balancing paper.

A preferred embodiment is a panel P comprising a powder based balancing layer 4, a powder based sub layer 12 on the upper part of the core 3, a raw decorative paper 2 applied on the powder based sub layer 12 and a protective overlay 1 on the raw decorative paper.

The powder based balancing layer 4 gives an improved balancing of the panel P since the fiber properties and orientation in the balancing layer 4 and the sub layer 12 may be similar and may result in the same shrinking after pressing and in different climate conditions. The protective overlay 1 may be a powder or paper based protective layer as described in the embodiments above.

Figure 5C:
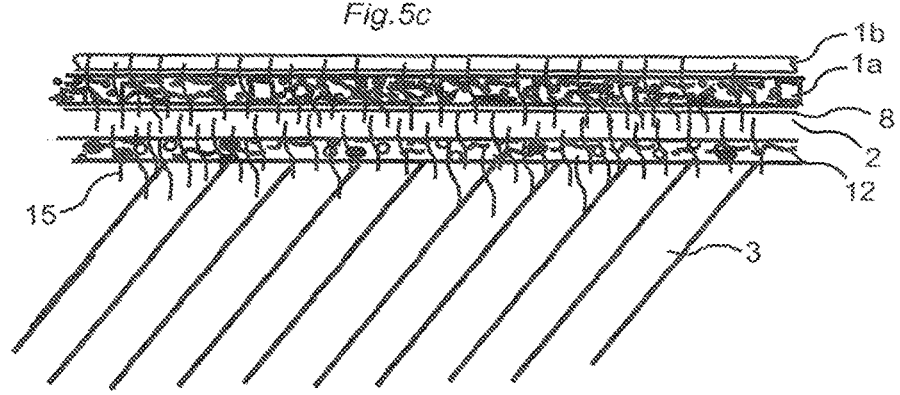

FIG. 5c shows a surface layer comprising a powder overlay 1a and a paper overlay 1b applied on the powder overlay. Preferably the paper overlay 1b is a raw paper which during pressing is impregnated with resins from the powder overlay 1a under the paper overlay 1b. The advantage is that the paper overlay 1b protects the press plates from the wear caused by the aluminum oxide particles. Very thin overlay papers may be used with a weight of 20-30 g/m$^2$.

The surface layer according to this embodiment comprises a first powder based sub layer 12 under a decorative paper 2 and a second powder based sub layer 1a under a transparent paper located above the decorative paper 2.

A powder based layer is characterized in the mechanically processed fibers have an average length of about less than 1 mm. Fibers used in an HDF core or in paper are longer and have an average length of several mm. The surface of the panel P is characterized in that the fibers in first 12 and second 1a sub layers are smaller than the fibers in the decorative paper the paper overlay.

Several alternatives are possible. The powder overlay 1a may only comprise melamine formaldehyde resins and aluminum oxide particles. It may also comprise bleached transparent wood fibers. The paper overlay may be a conventional impregnated overlay with or without aluminum oxide particles.

The second sublayer 1a will improve the wear and impact resistance even in the case when a conventional overlay is used.

A raw and essentially transparent paper overlay may also be used as a print carrier. A digital print 8 is applied on the print carrier. The print may be applied prior to or after the application of the raw overlay on the core. The raw overlay is preferably applied on a powder based sub layer 12 comprising fibers 14, a thermosetting resin 15, and color pigments 13. A powder overlay or a second conventional overlay may be applied on the raw overlay as a protective layer 1. The raw overlay is during pressing impregnated from the resins in the sub layer 12 and in the protective layer 1.

EXAMPLE

In example 1 below the powder mix formulation for the balancing layer 4 and the first sub layer 12 used comprising 50 weight-% recycled MDF fibers (Välinge Innovation Sweden), 50 weight-% Melamine Formaldehyde resin (Preferably 4865, Dynea). The powder formulation for the second sub layer 1a used comprises processed bleached wood fibers of about 25 wt %, 65 wt % of melamine formaldehyde resin and 10 wt % of aluminum oxide particles Example 1

Powder Based Panel Obtained Through Heat and Pressure

A balancing layer 4 and a first sub layer 12 was formed by scattering 300 g/m² of powder on the rear side and the front side of a 9.7 mm HDF core.

A raw decorative paper 2 with a weight of 60 g/m² was applied on the first sub layer 12 and a second sub layer 1a was applied on the decorative paper by scattering 200 g/m² of powder.

A 25 g/m² raw overlay was applied on the second sub layer 1a.

The core with the surface and balancing layers was pressed in a press with a pressure of 40 kg/cm², during 20 seconds. The upper press table applied a heat of 170° C. on the surface layer and the lower press table applied a heat of 175° C. on balancing layer. The surface was pressed against a press plate with an embossing depth of 0.3 mm.

A panel with an embossed decorative structure and a small pre tension backwards and a slightly convex surface was obtained. All raw papers were impregnated and cured during the pressing operation.

EMBODIMENTS

1. Method for producing a laminated product, for example a building panel, preferably a floor panel (P), wherein the method comprising the steps of:
    applying a paper (2) on one side of a wood fiber based core (3), e.g., an HDF panel,
    creating a décor (8) on the paper (2) by a digital printing process,
    applying a resin (5), preferably a melamine formaldehyde resin, on the paper (2);
    heating the décor (8) and the paper (2) with the resin (5), preferably by using an IR lamp (7); and
    applying heat and pressure in order to cure the resin and thereby obtain a laminated product.
2. The method as in embodiment 1, wherein the method further comprises the step of applying a powder based sub layer (12) on the core (3), said powder based sub layer (12) comprising wood fibers and a powder resin, preferably a melamine formaldehyde resin, before the paper (2) is applied on the core (3).
3. The method as in embodiment 2, wherein the method further comprises the step of applying moisture on the powder based sub layer (12) and thereafter applying heat in order to dry the powder based sub layer (12).
4. The method as in embodiment 1, wherein the method further comprises the steps of:
    applying a liquid resin (5), preferably a melamine formaldehyde resin, on the core (3); and
    drying the liquid resin (5), preferably by using an IR lamp (7), before the paper (2) is applied on the core (3).
5. The method as in any one of the preceding embodiments, wherein the resin (5) applied on the paper (2) is in powder form.
6. The method as in embodiment 5, wherein the method further comprises the step of applying moisture on the resin (5) in powder form.
7. The method as in any one of the preceding embodiments, wherein the method further comprises the step of applying wear resistant particles (16), preferably aluminum oxide particles, on the paper (2) before heating the décor (8).
8. The method as in any one of the preceding embodiments, wherein the method further comprises the step of applying cellulose fibers, preferably alpha cellulose fibers, on the paper, before heating the décor (8).
9. The method as in any one of the preceding embodiments, wherein the method further comprises the step of applying a balancing layer (4) on the other side of the core (3), before applying heat and pressure, to obtain a balancing layer.
10. The method as in embodiment 9, wherein the balancing layer (4) is a powder layer comprising wood fibers and a resin or a paper.
11. The method as in embodiments 2 or 3, wherein the paper (2) is a thin raw paper with a weight of about 40-60 g/m².
12. The method as in embodiments 2 or 3, wherein the paper (2) is a thin raw paper with a weight of about 40-50 g/m².
13. The method as in any one of the preceding embodiments, wherein a digital non-contact process is used comprising a Piezo print head that applies water based drops.
14. The method as in embodiment 13, wherein color pigments (13) are applied in a separate step in dry form and bonded by the water based drops.
15. The method as in any one of the preceding embodiments, wherein the step of creating the décor (8) by the digital printing process is performed after the paper (2) is applied to the core (3).
16. Method for producing a laminated product, for example a building panel, preferably a floor panel (P), wherein the method comprising the steps of:
    applying a powder based sub layer (12) comprising wood fibers and a thermosetting resin on a wood fiber based core (3), e.g., an HDF panel,
    applying a raw paper (2) on the powder based sub layer (12),
    applying a protective powder based or paper based overlay (1) comprising a melamine formaldehyde resin and aluminum oxide on said raw paper (2);
    applying heat and pressure in order to impregnate the raw paper (2), to cure the resin and thereby obtain a laminated product.

17. The method as in embodiment 16, wherein a powder based balancing layer (4) comprising wood fibers and a thermosetting resin is applied on a rear side of the core (3).

18. The method as in embodiment 16 or 17, wherein said overlay (1) is a powder based overlay (1*a*), and wherein a paper overlay (1*b*) is applied on the powder based overlay (1*a*).

19. A floor panel (P) comprising:
a core (3), preferably a wood fiber based core,
a balancing layer (4) on a rear side of said core (3), and
a surface layer on a front side of said core (3), said surface layer comprising a decorative paper (2), a protective transparent paper (1*b*), a first powder based sub layer (12) arranged under the decorative paper (2), and a second powder based sub layer (1*a*) arranged between the decorative paper (2) and the protective transparent paper (1*b*),
wherein the first and the second sub layers (12, 1*a*) comprise fibers having an average length which is smaller than the average length of the fibers in the decorative and overlay papers (2, 1*b*).

20. A floor panel (P) as in embodiment 19, wherein the balancing layer (4) is a powder based balancing layer comprising wood fibers.

The invention claimed is:

1. A method for producing a laminated product, the method comprising:
applying a powder-based sublayer comprising wood fibers and a thermosetting resin on a wood fiber based core;
applying a paper on the powder-based sublayer, wherein the paper is an unimpregnated paper when the paper is applied on the sublayer;
applying a protective overlay comprising a thermosetting resin and wear-resistant particles on the paper; and
applying heat and pressure in order to impregnate the paper, to cure the resins, and thereby obtain a laminated product.

2. The method according to claim 1, wherein a second powder-based balancing layer is applied on a rear side of the core.

3. The method according to claim 2, wherein the second powder-based balancing layer comprises wood fibers and a thermosetting resin.

4. The method according to claim 1, wherein a paper-based balancing layer is applied on a rear side of the core.

5. The method according to claim 1, wherein the protective overlay is a powder-based overlay.

6. The method according to claim 5, wherein a paper overlay is applied on the powder-based overlay.

7. A method for producing a laminated product, the method comprising:
applying a powder-based sublayer comprising wood fibers and a thermosetting resin on a wood fiber based core;
applying a paper on the powder-based sublayer, wherein the paper is an unimpregnated paper when the paper is applied on the sublayer;
applying a protective overlay comprising a thermosetting resin and wear-resistant particles on the paper; and
applying heat and pressure in order to impregnate the paper, to cure the resins, and thereby obtain a laminated product,
wherein the protective overlay is a powder-based overlay, and
wherein the powder-based overlay is applied by scattering.

8. The method according to claim 5, further comprising applying moisture on the powder-based overlay and drying the powder-based overlay.

9. The method according to claim 1, further comprising applying moisture on the powder-based sublayer and drying the powder-based sublayer.

10. The method according to claim 1, wherein the protective overlay is a paper-based overlay.

11. The method according to claim 1, further comprising providing a decor on the paper by a digital printing process.

12. The method according to claim 1, wherein the sublayer further comprises color pigments.

13. The method according to claim 1, wherein protective overlay further comprises wood fibers.

14. A method for producing a laminated product, the method comprising:
applying a powder-based sublayer comprising wood fibers and a thermosetting resin on a wood fiber based core;
applying a paper on the powder-based sublayer, wherein the paper is an unimpregnated paper when the paper is applied on the sublayer;
applying a protective overlay comprising a thermosetting resin and wear-resistant particles on the paper; and
applying heat and pressure in order to impregnate the paper, to cure the resins, and thereby obtain a laminated product,
wherein the powder-based sublayer is applied by scattering.

15. The method according to claim 1, wherein the powder-based sublayer is a first sublayer and wherein the method further comprises:
applying a second powder-based sublayer on the paper, and
applying a transparent paper on the second powder-based sublayer.

16. The method according to claim 1, wherein the thermosetting resin and wear-resistant particles of the protective overlay comprises a melamine formaldehyde resin and aluminum oxide.

17. The method according to claim 1, wherein the thermosetting resin of the sublayer comprises melamine formaldehyde resin or a melamine/urea resin.

18. The method according to claim 1, wherein the wood fiber based core is an HDF panel.

19. The method according to claim 1, wherein the laminated product is a building panel or a floor panel.

* * * * *

UNITED STATES PATENT AND TRADEMARK OFFICE
CERTIFICATE OF CORRECTION

| | | |
|---|---|---|
| PATENT NO. | : 10,364,578 B2 | |
| APPLICATION NO. | : 16/010874 | |
| DATED | : July 30, 2019 | |
| INVENTOR(S) | : Darko Pervan | |

It is certified that error appears in the above-identified patent and that said Letters Patent is hereby corrected as shown below:

In the Claims

Column 12, Lines 21-22, Claim 13:
"wherein protective overlay"
Should read:
-- wherein the protective overlay --

Signed and Sealed this
Seventh Day of May, 2024

Katherine Kelly Vidal
*Director of the United States Patent and Trademark Office*